US008727100B2

(12) United States Patent
Ecob et al.

(10) Patent No.: US 8,727,100 B2
(45) Date of Patent: May 20, 2014

(54) SELF-ALIGNING PALLETS AND A SYSTEM FOR AUTOMATED CONVEYING OF COMPONENTS THROUGH AN ASSEMBLY LINE

(75) Inventors: Robert Donald Ecob, Cambridge (CA); Bounna Wang, Milton (CA)

(73) Assignee: ATS Automation Tooling Systems Inc., Cambridge (CA)

( * ) Notice: Subject to any disclaimer, the term of this patent is extended or adjusted under 35 U.S.C. 154(b) by 16 days.

(21) Appl. No.: 13/434,224

(22) Filed: Mar. 29, 2012

(65) Prior Publication Data

US 2012/0247923 A1   Oct. 4, 2012

Related U.S. Application Data

(60) Provisional application No. 61/470,416, filed on Mar. 31, 2011.

(51) Int. Cl.
*B65G 15/12*   (2006.01)
*B65G 15/02*   (2006.01)
*B65G 17/02*   (2006.01)

(52) U.S. Cl.
CPC .............. *B65G 15/12* (2013.01); *B65G 15/02* (2013.01); *B65G 17/02* (2013.01)
USPC ............... 198/465.3; 198/867.13; 198/803.2; 198/415

(58) Field of Classification Search
USPC ............. 198/465.2, 465.3, 466.1, 620, 626.1, 198/867.13–867.15, 803.2, 415, 817, 837
See application file for complete search history.

(56) References Cited

U.S. PATENT DOCUMENTS

| 4,941,563 | A |   | 7/1990  | Fahrion |
|-----------|---|---|---------|---------|
| 5,078,254 | A | * | 1/1992  | Colonius et al. ........... 198/345.3 |
| 5,372,240 | A | * | 12/1994 | Weskamp .................. 198/465.1 |
| 5,857,413 | A | * | 1/1999  | Ward .............................. 104/48 |
| 6,062,799 | A |   | 5/2000  | Han et al. |
| 6,135,266 | A | * | 10/2000 | Weskamp .................. 198/465.2 |
| 6,191,507 | B1 | * | 2/2001 | Peltier et al. ............... 310/12.02 |
| 6,758,320 | B1 |   | 7/2004 | Tegel |
| 7,219,793 | B2 | * | 5/2007 | Robertsson et al. .......... 198/795 |
| 7,441,648 | B1 | * | 10/2008 | Kitazumi et al. ............. 198/623 |
| 7,458,454 | B2 |   | 12/2008 | Mendenhal |
| 7,878,320 | B2 | * | 2/2011 | Freudelsperger ............. 198/597 |
| 2011/0240443 | A1 | * | 10/2011 | Ecob .......................... 198/793 |

FOREIGN PATENT DOCUMENTS

WO            0132538        5/2001

OTHER PUBLICATIONS

International Searching Authority (CA), International Search Report and Written Opinion for International Patent App. No. PCT/CA2012/050194, Jul. 5, 2012.

* cited by examiner

*Primary Examiner* — Mark A Deuble
(74) *Attorney, Agent, or Firm* — Borden Ladner Gervais LLP; Jeffrey W. Wong

(57) ABSTRACT

The disclosure is directed at a system for conveying apparatus over a conveyor belt assembly. The system includes a set of pallets which support the apparatus and travel within parallel driving conveyors of the conveyor belt assembly. While the pallets in both driving conveyors are capable of rotation, only the pallets in one of the driving conveyors may move in a direction perpendicular to the direction of travel so that the apparatus may be centred over the conveyor belt assembly when the pallets are in motion.

7 Claims, 6 Drawing Sheets

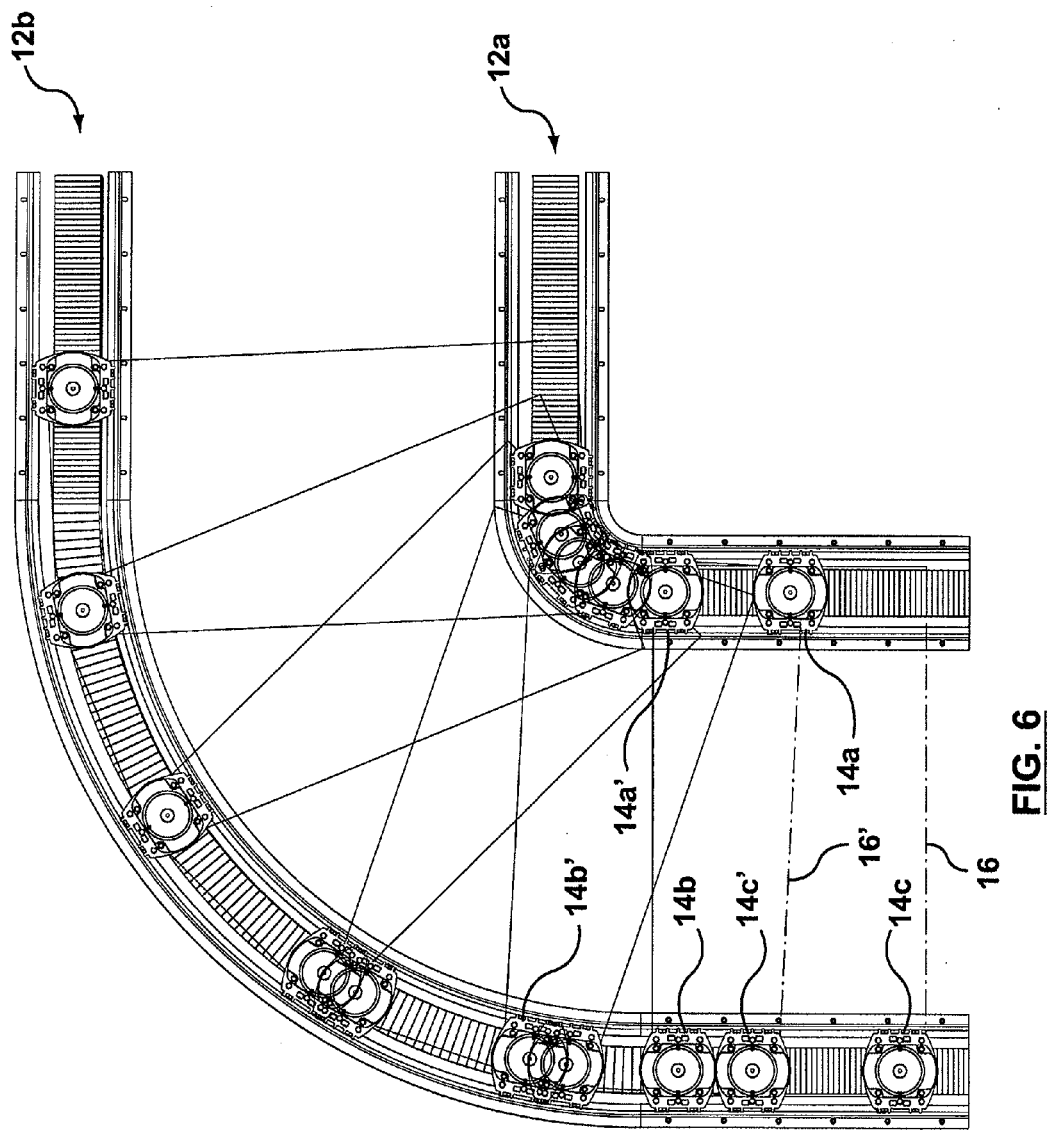

SELF-ALIGNING PALLETS AND A SYSTEM FOR AUTOMATED CONVEYING OF COMPONENTS THROUGH AN ASSEMBLY LINE

CROSS-REFERENCE TO RELATED APPLICATION

This application claims the benefit of U.S. Provisional Patent Application No. 61/470,416 filed Mar. 31, 2011, which is incorporated herein by reference.

FIELD OF THE DISCLOSURE

The present disclosure relates generally to self-aligning pallets and more specifically, to a method and system for automated conveying of components through an assembly line.

BACKGROUND OF THE DISCLOSURE

In a conveyor system, conveyor pallets are used to transport goods or products that are not suitable to be transported directly on the conveyor system itself by reason of the nature of the goods or the need to access the goods for processing, such as a plurality of goods in a magazine. In addition, the goods may require a pallet because of their shape and/or size, or due to their sensitivity, fragility or inability to be positionally stable.

Conveyor systems may have curved sections, diverts, merging mechanisms and the like and may operate at varying speeds. Accordingly, the pallet may be subject to sudden acceleration, deceleration or radial forces. Further, in conveying around curved sections, the pallets may become jammed due to mis-alignment in the conveyor tracks. If conveying an unstable, off-centered, or top heavy product, forces may cause the product to topple off of the pallet or become dislodged from the pallet, which could result in damage to the product or conveyor system. This may result in the need to shut down the conveyor system or may reduce the ability to be able to orient the product in a controlled manner on the conveyor system.

Conventional pallets are generally simple platforms that may have some fixtures or mechanisms for supporting a product thereon but can still be quite unstable, particularly when undergoing acceleration, deceleration or radial forces.

Thus, there is a need for a pallet or adapter having features address at least some of the challenges of alignment and stability while supporting a product, for example, a top heavy or an off-center product during travel over a conveyor system.

SUMMARY OF THE DISCLOSURE

It is desirable to provide a pallet and system for the conveyance of products into, through and out of an automated assembly line in an uncomplicated, reliable, repeatable and cost-effective manner. It is also desirable to have such a system which carries magazines which are easily accessible from underneath.

It is an aspect of the present disclosure to obviate or mitigate at least one disadvantage of previous conveyor systems and pallets for use with such conveyor systems.

In a first aspect, the present disclosure provides a conveyor system pallet comprising: a body having an upper surface with a rotatable post positioned generally orthogonal to the upper surface, the rotatable post being connectable to a support plate, magazine base, sub plate, chassis, frame, carrier, or the like.

In another aspect, the present disclosure provides a conveyor system pallet comprising: a body having an upper surface with a rotatable post positioned generally orthogonal to the upper surface, the rotatable post being connectable to a carrier.

In a preferred case, the post is rotatably connected to the upper surface using a cylindrical bearing.

In another preferred case, the rotatable post has a cap attachable thereto.

In another preferred case, the pallet upper surface has a wear surface.

In another preferred case, the wear surface is an annular ring.

In another preferred case, the wear surface is self lubricating.

In another aspect, the present disclosure provides a system for conveying a support rack, the system comprising: a conveyor system having a first track and a second track, the first track spaced horizontally from the second parallel track; a first pallet positioned on the first track, and a second pallet and a third pallet positioned on the second track and each of the pallets being rotatably attached to the support rack, such that the pallets are freely rotatable along a generally vertical axis through the pallets.

In a preferred case, each of the pallets have a rotatable post positioned generally orthogonal to an upper surface of the pallets.

In another preferred case, the rotatable post has a cap attachable thereto.

In another preferred case, the pallet upper surface has a wear surface.

In another preferred case, the wear surface is an annular ring.

In another preferred case, the wear surface is self lubricating.

BRIEF DESCRIPTION OF THE DRAWINGS

Other aspects and features of the present disclosure will become apparent to those ordinarily skilled in the art upon review of the following description of specific embodiments in conjunction with the accompanying figures.

Embodiments of the present disclosure will now be described, by way of example only, with reference to the attached Figures.

FIG. 6 is a top view showing the sequential progression of the conveyor system around a curve.

DETAILED DESCRIPTION

The present disclosure is directed at methods and system for conveying components through an assembly line or conveyor system. The system includes a set of pallets, preferably self-aligning, which may be controlled on the friction driven conveyor system. In operation, different components of the self-aligning pallets are controlled so that the movement of the pallets through the conveyor assembly is improved.

Figure 1:
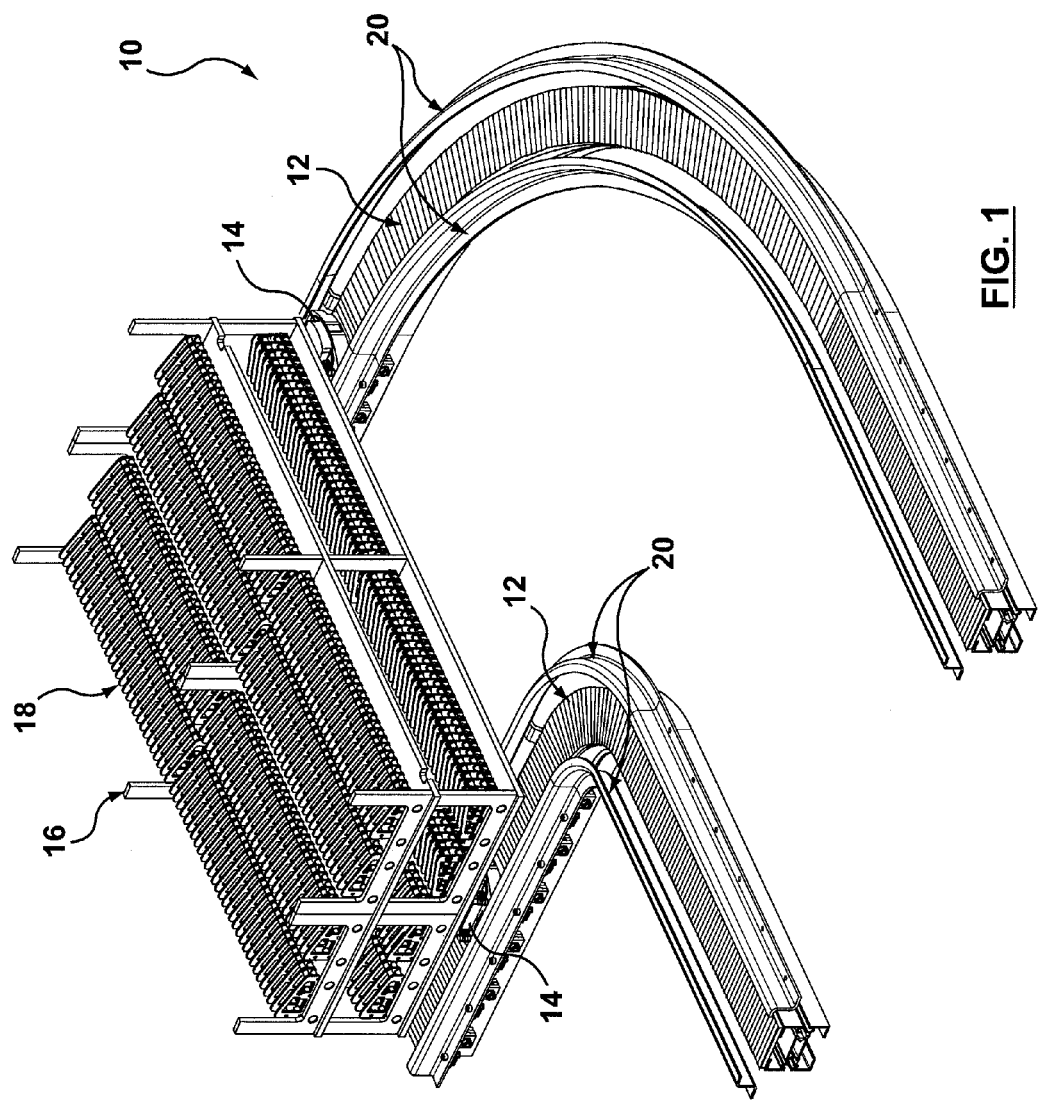
FIG. 1 is a perspective view of a conveyor system assembly.

FIG. 1 is a front perspective view of a portion of a conveyor system or assembly line with a magazine on top. The conveyor system 10 includes two parallel flexible link friction driving conveyors 12 which are spaced apart with a distance therebetween. Within the individual driving conveyors 12 are a set of pallets 14 which travel within the driving conveyors 12 but operate with each of the other pallets to assist in conveying a magazine 16 over the conveyor system. The number of pallets in the set of pallets is selected such that there is at least one pallet 14 in each of the driving conveyors 12 supporting the magazine 16. Preferably, the conveyors 12 provide for the conveyance of pallets 14 in a friction drive manner through the conveyor system 10.

The pallets 14 are shown in FIG. 1 as supporting the magazine 16 which stores a plurality of products or components 18. In the current embodiment, the products 18 are identical and are to be conveyed for processing. As shown, the magazine 14 is accessible from underneath within the space between the driving conveyors 12 such that access to the magazine 16 and products 18 is possible when the conveyor system 10 is stopped.

Turning back to the driving conveyors 12, each of the conveyors 12 include guide rails 20. The guide rails 20 assist to limit vertical movement of the individual pallets 14 and prevent tipping of the magazine 16 as will be described below.

Figure 2:
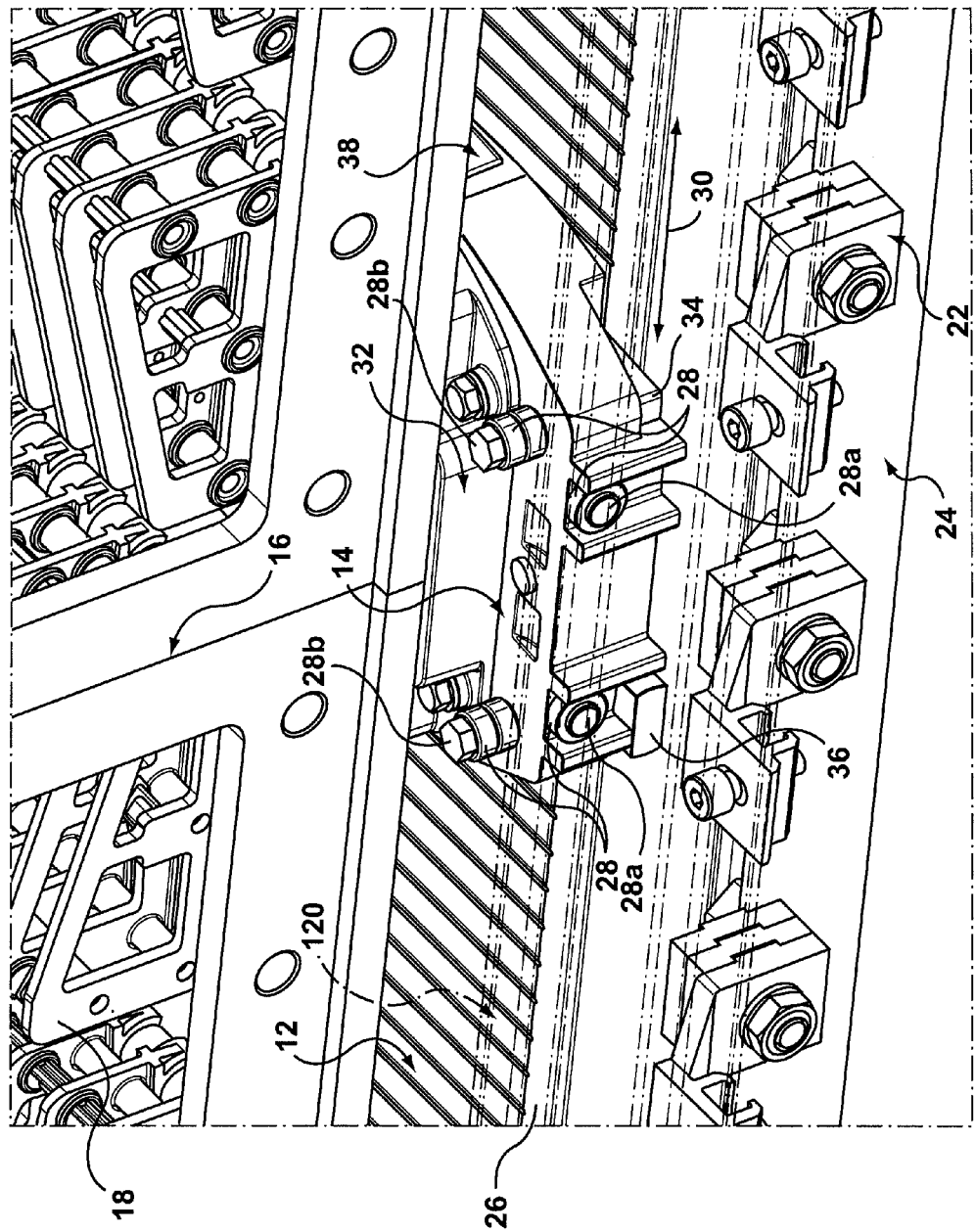
FIG. 2 is close up view of a pallet and adapter assembly of the system assembly shown in FIG. 1.

FIG. 2 is a close-up view of a pallet located within a driving conveyor supporting a magazine. For ease of view, the guide rail 20 is shown as see-through so that features of the pallet 14 may be viewed. The pallet 14 is located within the driving conveyor 12 and shown as supporting the magazine 16 and the product 18 within the magazine 16.

The conveyor guide rail 20 is supported by brackets 22 mounted to a conveyor support structure 24 and includes channels 26 for assisting in the movement and containment of the pallet 14. In one embodiment, pallet direction guide and anti-tip bearings or rollers 28 interact with the channels 26 of the conveyor guide rail 20 to provide more stable transport of the pallet 14 over the conveyor system 10.

As shown in the embodiment of FIG. 2, two lower rollers 28a are positioned to abut a lower ledge of the conveyor guide rail 20, or channels 26, thereby limiting vertical travel of the pallet 14 from the surface of the driving conveyor 12 while two upper rollers 28b are provided to abut a side of the conveyor guide rail 20 as the pallet 14 travels along the driving conveyor 12 in a direction of travel along the conveyor system 10. The direction of travel is identified as arrow 30. Although only two lower rollers and two upper rollers are shown, any number of rollers may be used depending on the characteristics of the conveyor system such as, but not limited to, the radius of curvature of turns within the conveyor system. For small radius of curvatures, more rollers may be included.

The pallet 14 further includes an adapter, such as plate 32 attached thereto which is preferably mounted or attached to the pallet. In one embodiment, the adapter plate 32 is bolted to the pallet 14, however it is contemplated that the adapter plate 32 may be attached via other methods such as, but not limited to, mechanical fasteners, adhesive, and the like.

The pallet 14 further includes a wear plate 34 and a sensor register 36. The sensor register 36 is used to track the location of the pallet 14 while it is moving within the conveyor system 10. Corresponding sensing apparatus for detecting the presence of the sensor registers 36 may be mounted throughout the conveyor system, such as along the channels 26 of the drive guide 20 or as individual mounted apparatus in proximity to the driving conveyors 12. The sensor registers 36 may include identification information to identify the magazine 16 or the products 18 that are being transported by the pallets 14 or may simply include an identification of the pallet 14.

The pallet 14 may also include a bumper portion 38. A second bumper may be mounted on an end opposite the bumper portion 38 so that there is protection for the pallet 14 in the direction of travel 30. In a preferred embodiment, the pallet 14 is one such as is described in U.S. Provisional Patent Application No. 61/318,938, filed Mar. 30, 2010, titled "Conveyor Pallet and Guiding System", the contents of which are incorporated herein by reference.

Figure 3:
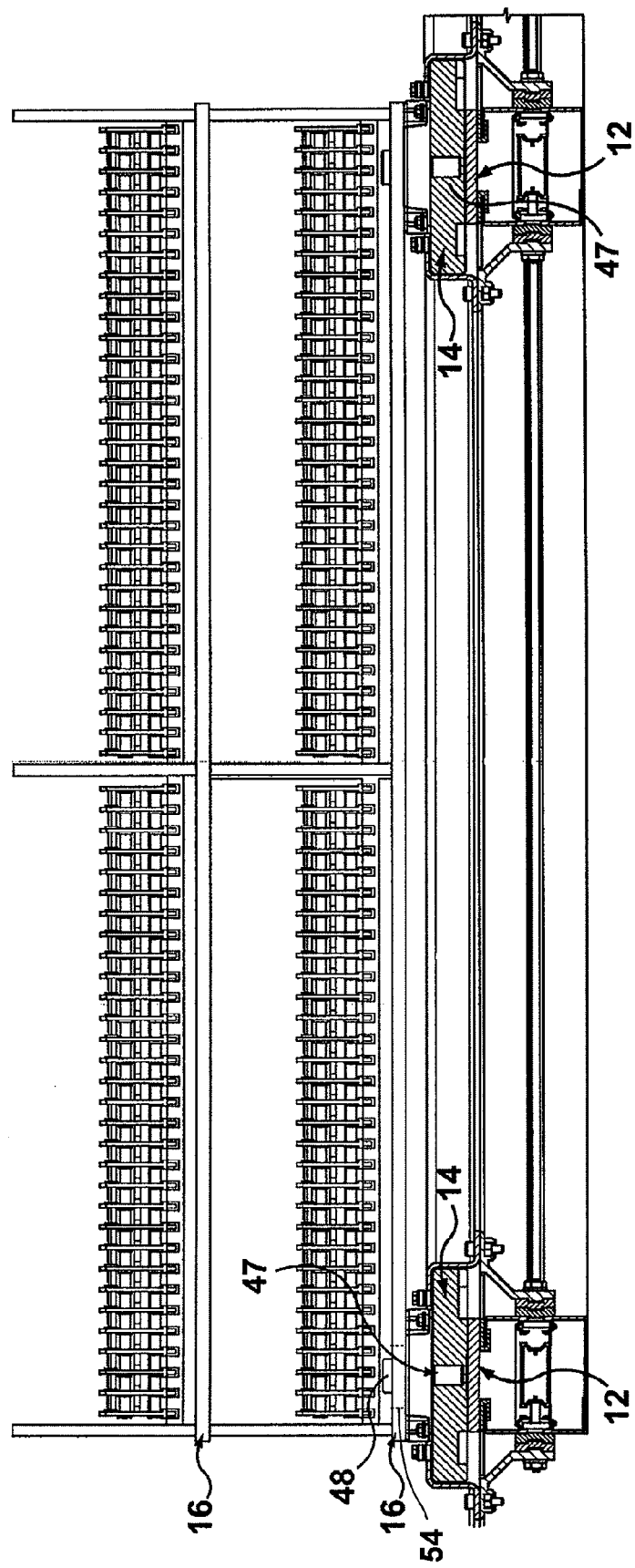
FIG. 3 is an end view of the conveyor system assembly of FIG. 1.

FIG. 3 shows a rear view of the conveyor system shown in FIG. 1. As can be seen, the magazine 16, or pair of magazines, rest atop the pallets 14 which are located within the driving conveyors 20.

Figure 4:
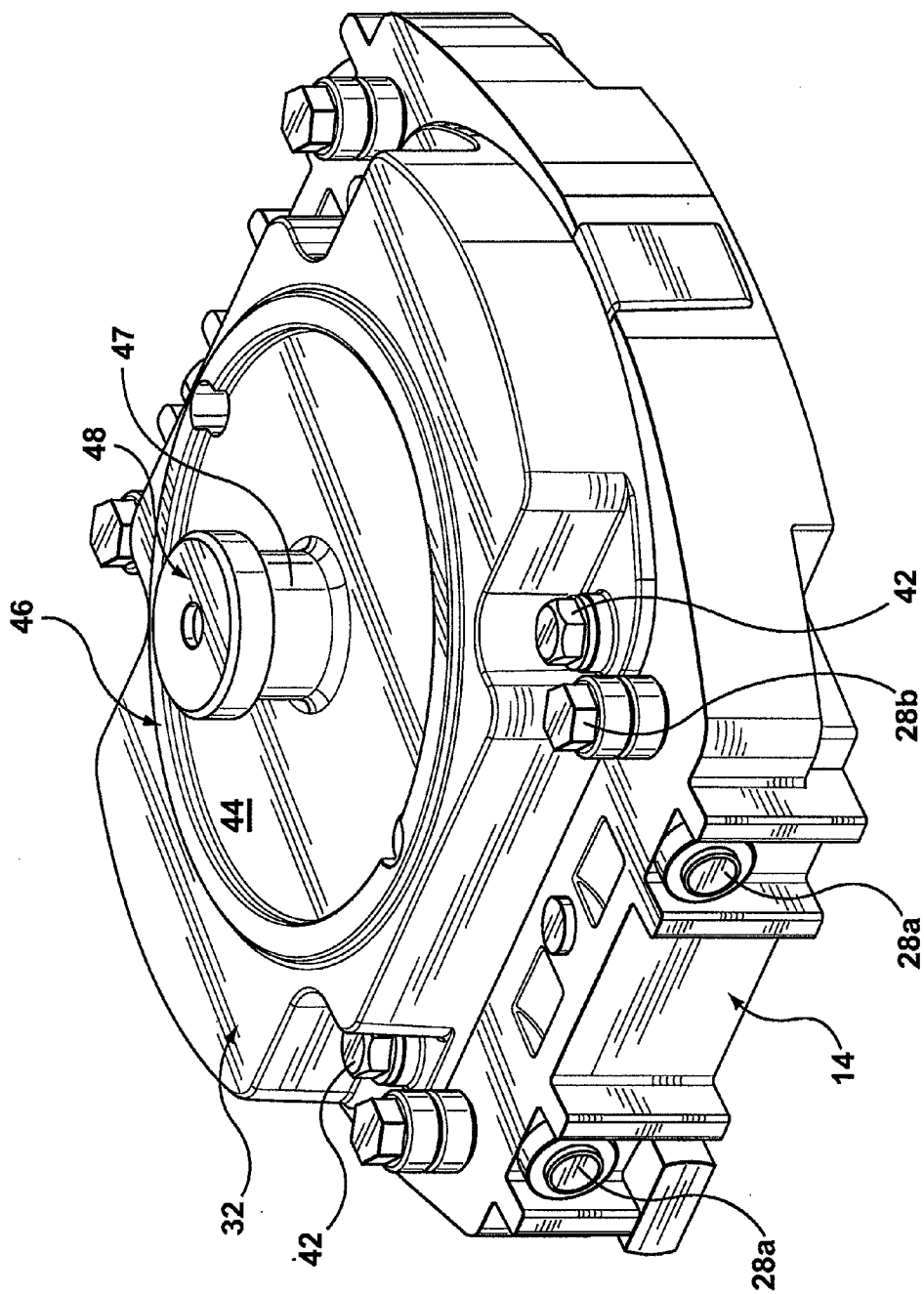
FIG. 4 is a perspective view of the pallet and adapter assembly.

FIG. 4 is a perspective view of a pallet. As described above, the pallet 14 includes the adapter plate 32 which, in the current embodiment, is fixed thereto via a set of fasteners, such as bolts 42. The adapter plate 32 is shown as a plate having an upper surface 44 with an annular wear surface 46, preferably self-lubricating, circumscribing an area of the upper surface 44 of the adapter plate 32. Proximate a middle of the annular wear surface 44 is a rotatable post 47 which rotates through an axis approximately orthogonal to a plane of the upper surface 44. A retaining cap 48 is shown positioned on a top of the rotatable post 46 for keeping the post in place, such as against the magazine, when the pallet 14 is in use. The post 46 is preferably fixed to a bearing (not shown) within the adapter plate 32. Although shown as a plate 32, the adapter may be any other apparatus which performs similar functionality. As can be seen from FIG. 3, the adapter plate 32 is attached to the magazine 16 by positioning the rotatable post 46 against a base of the magazine 16, and then fixing the cap 48 to the post 46 such that a thickness of the base of the magazine 16 is between the cap 48 and the upper surface 44. Alternatively, the rotatable post 46 can be fitted through a hole in the base of the magazine 18 and held in place by affixing the cap 48 to the top of the post 46. Other methods of mounting or connecting the magazine 16 to the pallet 14 may be contemplated.

Figure 5:
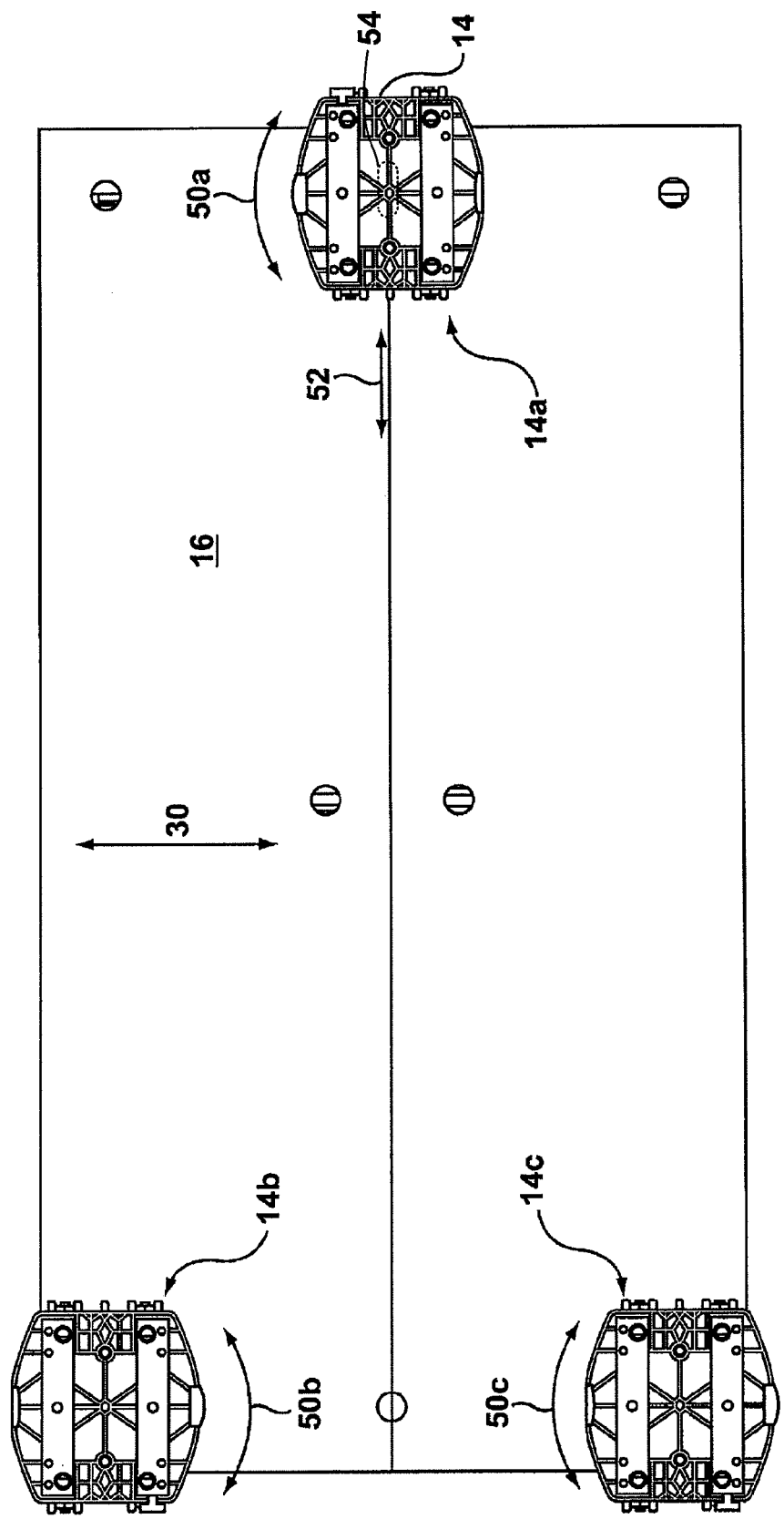
FIG. 5 is a bottom view of a magazine and three pallets attached thereto.

FIG. 5 is a underside view of a set of pallets. The driving conveyors have been removed in this Figure so that a clearer representation of a three pallet embodiment and their relationship may be shown and described. Depending on the set up of the system, any number of pallets may be used. The interaction and cooperative movement of the set of pallets when the conveyor system is in operation assist in providing an improved system and method for conveying components through the conveyor system. In the current embodiment, three pallets 14a, 14b and 14c are shown.

The pallets 14 rotate through individuals arcs, identified as 50a, 50b and 50c, respectively. Rotation of each of the pallets 14 is via the individual rotatable posts 46 which have a predetermined amount of rotation and assists to reduce or prevent the pallets 14 from "jamming" when they are moving within the driving conveyors 12. Directional arrow 30 represents the direction of travel of the combination of the magazine 16 and pallets 14 within the conveyor system 10.

As shown, a single pallet 14a is positioned at one side of the magazine 16 within one driving conveyor 12, while two pallets 14b and 14c are positioned within the other driving conveyor 12 on opposite sides of the magazine 16 from pallet 14a. In operation, pallet 14a is capable of linear movement along the line, identified as bidirectional arrow 52, which is generally transverse to the direction of travel 30. In one embodiment, this is achieved either by fixing the pallet 14b through a slot 54 in the magazine 16, or by attachment of the post 46 (associated with pallet 14a) to the adapter plate 32 (associated with pallet 14a) such that the post is movable in the direction 52.

In operation, as the pallets traverse around a corner of the conveyor system, the two pallets 14b and 14c control the arc of rotation for the magazine 16. The three pallets 14a, 14b and 14c form a triangular pattern, which would require the single pallet 14a on the opposite side to move away from the two pallets 14b and 14c. This is compensated for with a generated curve for the radial section of the larger conveyor turn of the "outside" conveyor, but the flexible belt will not track around this variable geometry, therefore allowing the single pallet 14a to "float" in one direction (perpendicular to the direction of motion) so that it is able to find its own position relative to the opposite pair of pallets.

FIG. 6 is a top view of a conveyor system showing a sequential progression of pallets moving around a curve of the conveyor system. As with the example of FIG. 5, the magazine 16 is supported by a set of three pallets 14a, 14b and 14c in this example. As pallet 14a moves along its driving conveyor 12a and pallets 14b and 14c move along driving conveyor 12b, the pallets 14a, 14b and 14c find their own neutral orientation to the magazine 16, in particular through the corner by rotation on their respective axes. This is achieved by the rotation of the individual rotatable posts 46 and the ability for pallet 14a to move in the direction of arrow 52. Therefore, as the pallets 14 move along the conveyor system, and more specifically around a curve, pallets 14b and 14c are stationary with respect to travel in a direction perpendicular to the direction of travel, however, they may rotate about their rotatable posts. With pallet 14a, as the magazine 16 and pallets 14 navigate the curve of the conveyor system, pallet 14a may move in a direction perpendicular to the direction of travel to assist in centering the magazine over the conveyor system, thereby reducing the likelihood that the pallets, or magazine may stop moving. Therefore, by allowing pallet 14a to move in a lateral direction, or direction perpendicular to the direction of travel, provides for an improved conveyance system.

For ease of understanding, the reference numbers without a prime designation is an initial position while the reference numbers with a prime designation, seen as including an apostrophe, is a position of the pallet or magazine at a different period of time. For example, pallets 14a', 14b' and 14c' and outline of magazine 16' are shown to represent a progression into the curve from the previous location shown as pallets 14a, 14b and 14c and outline of magazine 16.

In operation, as can be seen, the relative distance between the pallet 14a and the pallets 14b and 14c, changes as the pallets progress around the curve. As discussed above, pallet 14a is able to move in a lateral direction 52, for example by sliding within a slot 54 which may be the hole within the magazine 16 through which the rotatable post 46 is located. This lateral movement of pallet 14a adjusts the position of pallet 14a relative to the other pallets 14b and 14c and thus pallet 14a remains "on center" with respect to driving conveyor 12a. In the system shown in FIG. 6, the direction of travel of the magazine, carrier or such, is controlled in linear and radial directions by pallets 14b and 14c as these only have rotational freedom of movement in a vertical axis as provided by the individual rotatable posts 46.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope of the description.

What is claimed is:

1. A conveyor system for automated conveying of an apparatus, the system comprising:
    a conveyor assembly including a pair of spaced apart driving conveyors for directing the apparatus in a direction of travel ;
    a set of at least two pallets for supporting and conveying the apparatus over the conveyor assembly, whereby at least one pallet is associated with each of the driving conveyors;
    wherein when the set of pallets travel around a curve in the conveyor assembly, the pallets in the first driving conveyor move laterally to the direction of travel, with respect to the apparatus, to maintain a centering of the apparatus over the conveyor assembly; and
    whereby pallets in a first driving conveyor are configured such that the apparatus is operable to move laterally to the direction of travel.

2. The system of claim 1 wherein the pallets in a second of the driving conveyors only move in a rotational manner with respect to the apparatus.

3. The system of claim 2 wherein the pallets in the first driving conveyor move in a rotational manner with respect to the apparatus.

4. The system of claim 1 wherein a pallet within the set of pallets comprises:
    a body portion;
    a set of rollers, connected to the body portion, for connecting the pallet to the driving conveyor; and
    a mounting mechanism, connected to a top of the body portion, for connecting the pallet to the apparatus.

5. The system of claim 4 wherein the set of rollers comprise:
    a set of lower rollers abut a lower edge of the driving conveyor; and
    a set of upper rollers for abut a side surface of the driving conveyor.

6. A conveyor system for automated conveying of an apparatus, the system comprising:
    a conveyor assembly including a pair of spaced apart driving conveyors for directing the apparatus in a direction of travel;
    a set of at least two pallets for supporting and conveying the apparatus over the conveyor assembly, whereby at least one pallet is associated with each of the driving conveyors;
    whereby pallets in a first driving conveyor are configured such that the apparatus is operable to move laterally to the direction of travel;
    wherein a pallet within the set of pallets comprises:
        a body portion;
        a set of rollers, connected to the body portion, for connecting the pallet to the driving conveyor; and
        a mounting mechanism, connected to a top of the body portion, for connecting the pallet to the apparatus;
        wherein the mounting mechanism comprises:
            an adapter plate;
            a rotatable post, located within the adapter plate; and
            a cap portion for holding the rotatable post in place against the apparatus.

7. The system of claim 6 wherein the apparatus is a magazine.

* * * * *